(12) United States Patent
Larsen

(10) Patent No.: US 8,588,614 B2
(45) Date of Patent: Nov. 19, 2013

(54) FLEXIBLE DISTRIBUTED ANTENNA SYSTEM

(75) Inventor: Tormod Larsen, Geneva, IL (US)

(73) Assignee: ExteNet Systems, Inc., Lisle, IL (US)

( * ) Notice: Subject to any disclaimer, the term of this patent is extended or adjusted under 35 U.S.C. 154(b) by 454 days.

(21) Appl. No.: 12/781,881

(22) Filed: May 18, 2010

(65) Prior Publication Data

US 2010/0296816 A1    Nov. 25, 2010

Related U.S. Application Data

(60) Provisional application No. 61/180,462, filed on May 22, 2009.

(51) Int. Cl.
*H04B 10/00* (2006.01)

(52) U.S. Cl.
USPC ............................ 398/115; 398/124; 398/125

(58) Field of Classification Search
USPC ................................................. 398/115–131
See application file for complete search history.

(56) References Cited

U.S. PATENT DOCUMENTS

| | | | |
|---|---|---|---|
| 6,002,368 A | 12/1999 | Faraone et al. | |
| 2004/0219950 A1 | 11/2004 | Pallonen | |
| 2005/0255850 A1 | 11/2005 | Auterinen | |
| 2007/0274279 A1* | 11/2007 | Wood et al. | 370/343 |
| 2008/0119198 A1 | 5/2008 | Hettstedt et al. | |
| 2008/0192855 A1* | 8/2008 | Shapira et al. | 375/267 |
| 2008/0285675 A1 | 11/2008 | Roberts | |
| 2009/0005096 A1* | 1/2009 | Scheinert | 455/513 |
| 2009/0316608 A1* | 12/2009 | Singh et al. | 370/280 |
| 2010/0002662 A1* | 1/2010 | Schmidt et al. | 370/338 |
| 2010/0296458 A1* | 11/2010 | Wala et al. | 370/329 |

OTHER PUBLICATIONS

International Search Report and Written Opinion for PCT/US2010/035597.

* cited by examiner

*Primary Examiner* — Dzung Tran
(74) *Attorney, Agent, or Firm* — Jeffrey A. Pine; Dykema Gossett PLLC

(57) ABSTRACT

An apparatus and method for implementing a flexible distributed antenna system (DAS) head end are disclosed. A flexible DAS head end includes an RF conditioning module configured to be connected to one or more base station transceiver (BTS) devices and one or more low-power RF modules that are also part of the flexible DAS head end. In an example embodiment, the flexible DAS head end receives high-power digital-RF passband transmissions from its connections to the one or more BTS devices, and low-power digital-RF passband signals from the one or more low-power RF modules. The low-power RF modules, in turn, can receive input baseband signals from one or more baseband units (BBUs) in a wireless network, and then convert the input signals to the lo low-power digital-RF passband signals. The RF conditioning module constructs one or more superposition RF signals from the passband signals, and routes and transmits them to an array of antenna nodes.

28 Claims, 8 Drawing Sheets

FLEXIBLE DISTRIBUTED ANTENNA SYSTEM

RELATED APPLICATION

This Application claims the benefit of priority to U.S. Provisional Application 61/180,462 filed May 22, 2009, which is hereby incorporated by reference herein.

BACKGROUND

A wireless communication system typically provides one or more forms of wireless access to mobile access devices, enabling them to engage in voice and data communications with other devices—both wired and wireless—operating in or connected to the system, and to partake in various other communication services provided or supported by the system. The communication path from a mobile access device, such as a cellular telephone, personal digital assistant (PDA), or an appropriately equipped portable computer, for instance, to one or more other communication endpoints generally traverses a radio frequency (RF) air interface to a base transceiver station (BTS) or other form of access point, and on into a core transport network via a base station controller (BSC) connected to a mobile switching center (MSC) or to a packet data serving node (PDSN). The MSC supports primarily circuit voice communications, providing interconnectivity with other MSCs and PSTN switches, for example. The PDSN supports packet data communications, providing interconnectivity with packet-data networks, such as the Internet, via other packet-data switches and routers.

In a cellular wireless system, the BTS, BSC, MSC, and PDSN, among possibly other components, comprise the wireless access infrastructure, also sometimes referred to as the radio access network (RAN). A RAN is usually arranged according to a hierarchical architecture, with a distribution of multiple BTSs that provide areas of coverage (e.g., cells) within a geographic region, under the control of a smaller number of BSCs, which in turn are controlled by one or a few regional (e.g., metropolitan area) MSCs. As a mobile device moves about within the wireless system, it may hand off from one cell (or other form of coverage area) to another. Handoff is usually triggered by the RAN as it monitors the operating conditions of the mobile device by way of one or more signal power levels reported by the device to the RAN.

As the demand for wireless services has grown, and the variety of physical environments in which wireless access is provided becomes more diverse, the need for new topologies and technologies for coverage has become increasingly important. At the same time, alternative methods of wireless access, including WiFi and WiMax, are becoming more ubiquitous, particularly in metropolitan areas. Consequently, traditional cellular service providers are looking for ways to integrate different types of wireless access infrastructures within their core transport and services networks. In addition, as wireless access infrastructures of different service providers tend to overlap more and more within smaller spaces, the ability to share common infrastructure offers cost and operational benefits to network owners and operators.

SUMMARY

A particular architectural challenge facing the wireless access infrastructure is to provide adequate coverage in locations where RF signals do not reach or penetrate, and on a relatively fine geographic scale, using equipment that is physically unobtrusive. One solution to emerge is a distributed antenna system (DAS), which subdivides and distributes the radio transmitter/receiver functionality of the BTS among a number of smaller, lower-power antenna nodes. The nodes can be deployed so as to provide coverage within underserved structures (e.g., in buildings) or over terrain where deployment of traditional cell towers is impractical or not permitted. In what is referred to herein as the "standard DAS architecture" (or just DAS for short), the radio and antenna subsystem of a "traditional" BTS is replaced with a DAS "head end" unit that splits the input RF signal into separate signal portions and routes them as digital-optical signals to small, remote antenna nodes via fiber optic transmission links. Each node then transmits only its RF signal portion. The DAS head end also receives signal portions from the remote nodes, and combines them for relay back into the network. The DAS head end receives its input from one or more traditional BTSs. More specifically, the traditional BTS includes an RF modulation subsystem (RF module) that converts the input baseband signals from the network into passband signals on RF carriers. The output of the RF module is then connected to the input of the DAS via a high-power (e.g., 20 W), digital link. In the reverse direction, RF signals received via the digital link are down-converted in the BTS to baseband for transmission into the network. The interface between the RF module and the DAS head end is same as that between the RF modulation subsystem and the radio/antenna subsystem of a traditional BTS. As such, multiple BTSs from multiple service providers can be connected to single DAS head end, thus allowing them to share a common access infrastructure.

In an alternative DAS architecture, encoded baseband signals are routed from a baseband unit (BBU) to remote "radio heads" where the signals are modulated to appropriate RF carriers for radio transmission to mobile devices. The baseband links between the BBU and the remote radio heads are low-power (e.g., a few mW), fiber-optic lines that support communications according to one or another open interface protocols developed for decentralizing BTS operation. Each remote radio head includes a remote digital-to-RF module that functions analogously to the RF module of the traditional BTS. For the purposes of the discussion herein, the alternative DAS architecture shall be referred to as the "remote radio head" (RRH) architecture.

Each form of DAS architecture has advantages and disadvantages. Consequently, service providers must weigh tradeoffs when evaluating decisions to deploy one or the other. The RRH architecture largely eliminates the need for costly, high-power RF conversion in the traditional BTS by distributing encoded baseband signals directly to the remote radio heads. Moreover, the network input to the BBU is not restricted only to circuit-cellular data, but admits other forms of network traffic and protocols, including WiFi, WLAN, and other types of native packet data transport. However, each baseband link from the BBU to a particular remote radio head can generally support only one transport technology at a time (e.g., CDMA, GSM, WiFi, etc.), and each node can generally modulate a given incoming link to just one RF carrier for any one configuration of the given link. In addition, each remote radio head incorporates a dedicated remote RF module. Thus, even though each RF module is relatively inexpensive compared with that of a traditional BTS, the number of RRH RF modules in any given deployment scales directly with the number of remote nodes. Finally, a single BBU supports one service provider at a time, since each baseband link can be configured for only one carrier frequency and one transport technology at a time.

The DAS architecture has its own tradeoffs. The head end of the standard DAS architecture includes an RF conditioning module that can split and distribute multiple input RF signals from one or more networks or service providers' traditional BTSs, and then route the separate signals to the different nodes according to coverage topologies (e.g., cells and/or sectors) specified by the service providers. Thus the DAS head end supports diverse deployment topologies of remote nodes. In addition, since each RF input is the output of the RF module of a source BTS, the DAS head end and remote nodes can accommodate multiple carriers and cellular transport technologies in concurrent transmissions, thereby achieving concurrent sharing of radio resources. The RF conditioning module can also load balance the power delivered among the remote nodes based on the traffic load at each node. However, the standard DAS architecture still requires each source BTS to include an expensive RF module, and to support a high-power digital interface to the DAS head end. Further, the physical distance of this interface link is limited, unless some form of repeater is employed. In addition, the transport technologies supported are limited to those of traditional BTSs, making integration with native packet-based transport more difficult.

The distinct approaches offered by the two DAS architectures present service providers and network operators with a set of "either-or" of solutions, none of which may fully and simultaneously address challenges such as diversity of transport technologies, common access infrastructure, and versatility of coverage configurations, among others.

A more versatile DAS architecture is needed to address these and other challenges of configuring and deploying wireless access infrastructures. Accordingly, various embodiments of the present invention provide a flexible DAS that can: support a wide and expandable array of transport technologies from the network side; or support concurrent processing, transmission, and reception of communications according to some, or any or all of the relevant technologies; or support simultaneous RF transmission and reception on different RF carriers; or support versatile and diverse coverage topologies among a distribution of antenna nodes; or incorporate intelligent routing of signals to antenna nodes, and support load balancing among the antenna nodes; or enable different service providers to share a common wireless access infrastructure; or some combination of some or all of the forgoing.

Hence, in one respect, embodiments of the present system provide an apparatus comprising: a radio frequency (RF) conditioning module having a plurality of first physical interfaces and being configured to: receive a respective input digital RF physical signal via each of one or more of the plurality of first physical interfaces, split each received respective input digital RF physical signal into a respective number of duplicate signals, combine particular duplicate signals selected from among each of the respective number of duplicate signals into one or more superposition RF signals, and route and transmit the one or more superposition RF signals to an array of remote antenna nodes to which the apparatus is configured to be communicatively coupled; and one or more low-power RF modules each having a communicative connection to one of the plurality of first physical interfaces, and each configured to: receive a respective baseband digital optical signal via a respective second physical interface, modulate the received respective baseband digital optical signal to a respective RF passband signal, and send the respective RF passband signal to the RF conditioning module via the communicative connection to the one of the plurality of first physical interfaces as one of the respective input digital RF physical signals.

In another respect, embodiments of the present system provide an apparatus comprising: a radio frequency (RF) conditioning module having a plurality of first physical interfaces; one or more low-power RF modules each having a communicative connection to one of the plurality of first physical interfaces; a processor; and machine logic executable by the processor to cause the apparatus to: receive a respective input digital RF physical signal via each of one or more of the plurality of first physical interfaces of the RF conditioning module, at the RF conditioning module, split each received respective input digital RF physical signal into a respective number of duplicate signals, at the RF conditioning module, combine particular duplicate signals selected from among each of the respective number of duplicate signals into one or more superposition RF signals, at the RF conditioning module, route and transmit the one or more superposition RF signals to an array of remote antenna nodes to which the apparatus is configured to be communicatively coupled, at a given one of the one or more low-power RF modules, receive a baseband digital optical signal via a respective second physical interface, at the given one of the one or more low-power RF modules, modulate the received respective baseband digital optical signal to an RF passband signal, and at the given one of the one or more low-power RF modules, send the RF passband signal to the RF conditioning module via the communicative connection to the one of the plurality of first physical interfaces as one of the respective input digital RF physical signals.

In yet another respect, embodiments of the present system provide, in an apparatus comprising (i) a radio frequency (RF) conditioning module having a plurality of first physical interfaces and (ii) one or more low-power RF modules each having a communicative connection to one of the plurality of first physical interfaces, a method comprising: at the RF conditioning module, receiving a respective input digital RF physical signal via each of one or more of the plurality of first physical interfaces; at the RF conditioning module, splitting each received respective input digital RF physical signal into a respective number of duplicate signals; at the RF conditioning module, combining particular duplicate signals selected from among each of the respective number of duplicate signals into one or more superposition RF signals; at the RF conditioning module, routing and transmitting the one or more superposition RF signals to an array of remote antenna nodes to which the apparatus is communicatively coupled; at a given one or more of the one or more low-power RF modules, receiving a respective baseband digital optical signal via a respective second physical interface; at the given one or more of the one or more low-power RF modules, modulating the received respective baseband digital optical signal to a respective RF passband signal; and at the given one or more of the one or more low-power RF modules, sending the respective RF passband signal to the RF conditioning module via the communicative connection to the one of the plurality of first physical interfaces as one of the respective input digital RF physical signals.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to wireless access technologies including Code Division Multiple Access (CDMA), UMTS, GSM, WiFi, and WiMax, although the invention is not limited to these technologies. CDMA and GSM are typically deployed in cellular wireless communication systems, and generally encompass a number of related technologies that collectively and/or individually support both circuit-cellular communications, including voice and circuit-based packet communications, and native packet-data communications. For the purposes of the discussion herein, a "CDMA family of protocols" shall be taken to apply to all such technologies. Examples of protocols in the family include, without limitation and of one or more versions, IS-95, IS-2000, IS-856, and GSM, among others. Native packet-data wireless protocols and technologies, include, without limitation WiFi, WiMax, WLAN, and IEEE 802.11, some or all of which may be interrelated. The term "wireless Ethernet" is also sometimes used to describe one or another of these protocols or aspects of these protocols.

Figure 1:
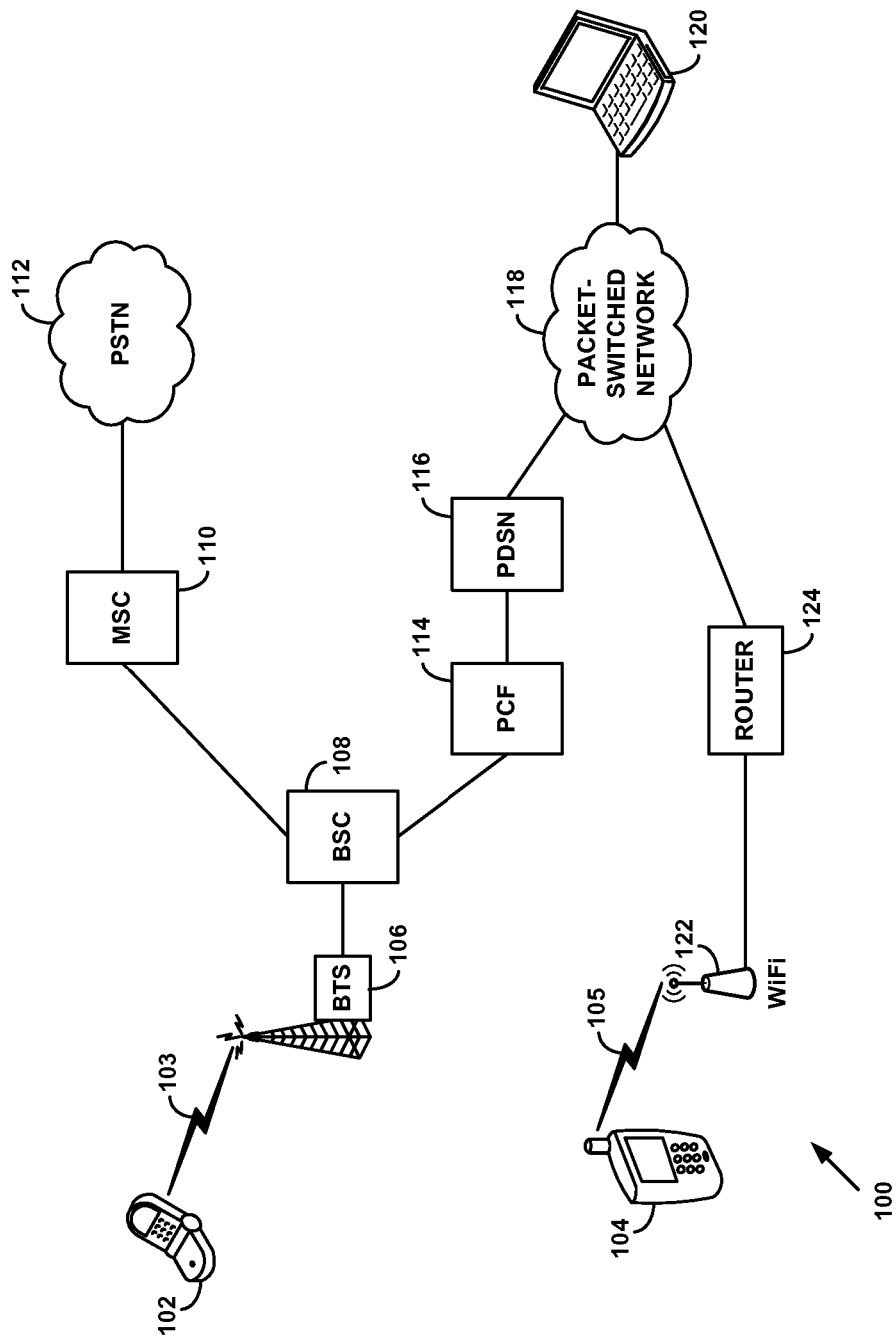
FIG. 1 is an example of a wireless communication system in which embodiments of a flexible DAS head end could be deployed.

FIG. 1 shows an example wireless communication system owned and/or operated by a service provider in which an example embodiment of a flexible DAS could be deployed. A wireless access device 102 is communicatively connected to the system by way of an RF air interface 103 to a BTS 106, which in turn is connected to a BSC 108. The RF air interface 103 is defined and implemented according to one or more of a CDMA family of protocols. The BSC is connected to an MSC 110 for circuit-cellular communications, and via a packet control function (PCF) 114 to a PDSN 116 for packet data communications. The MSC is connected to a PSTN 112, thus providing a communication path to landline circuit networks. The connection to the PSTN 112 is also intended to represent trunk connections between the MSC 110 and other circuit switched, including (without limitation) local exchange switches, interexchange switches for long-distance services and interconnections with other carriers' networks, and other MSCs both in the carrier's network and other carriers' networks.

As indicated, the PDSN 116 is connected to a packet-switched network 118, which could be the Internet or a core packet transport network that is part of the wireless communication system. A computer 120 is also shown being connected to the packet network 118, and the wireless device 102 could engage in communications with the computer 120 via a path such as the one just described. It will be appreciated that, although not shown, other communication devices, as well as communication and application servers could be connected in one way or another to the network 118. In addition, the network 118 may comprise other equipment including, without limitation, routers, switches, transcoding gateways, security gateways and firewalls, and other components typical of a communication and transport network.

Also shown in FIG. 1 is a second wireless access device 104, which is connected to the wireless communication system via the air interface 105 to a WiFi access point 122. The access point is in turn connected to a router 124, which then connects to network 118. Although not shown for the sake of brevity, it will be appreciated that this connection could include other packet routing/processing elements. The access device 104 could also engage in communications with one or more communication endpoints via the physical path shown in the figure. The detailed protocols and methods for establishing communications between either of the devices 102 or 104 and other devices and communication endpoints in the network are well-known, and not discussed further herein.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention or embodiments thereof. Further, the network components that make up a wireless communication system such as the system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device, such as the example access devices 102 and 104, typically comprises a user-interface, I/O components, a communication interface, a tone detector, a processing unit, and data storage, all of which may be coupled together by a system bus or other mechanism.

1. Distributed Antenna System Architectures a. Standard DAS Architecture

Figure 2:
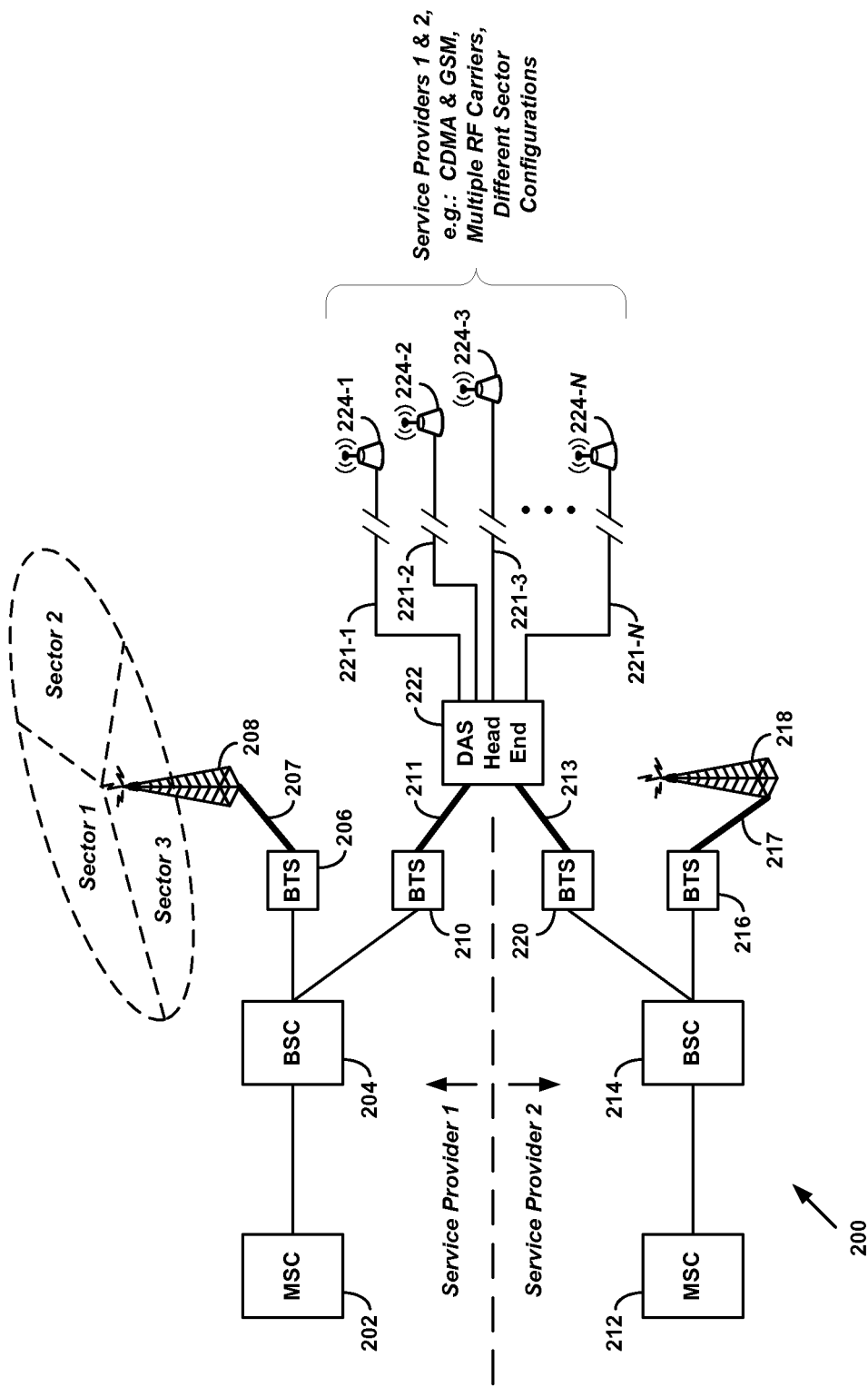
FIG. 2 illustrates an example deployment of a standard DAS architecture.

A network 200 in FIG. 2 illustrates a high-level view of an implementation of a distributed antenna system according to an example configuration of a standard architecture. By way of example, the DAS implementation in this illustration is shown as providing a common access infrastructure for two service providers (labeled "Service Provider 1" and "Service Provider 2"). As shown, in the network of Service Provider 1, MSC 202, is connected to a BSC 204, which in turn is connected to a BTS 206 and BTS 210. The BTS 206 is a traditional BTS, having a high-power digital radio connection 207 to an antenna tower 208. In practice, a digital connection 207 carries a signal with a power of roughly 20 watts (W), and is commonly implemented as a coaxial cable between the BTS and an RF transmission component that transmit the RF signal via antenna elements at or near the top of the tower. The broadcast signal generally has a power level similar to that of the input (i.e., roughly 20 W).

The coverage area provided by the BTS (including the transmitting antennas) is typically a cell or cell sectors. By way of example, the BTS 206 (in conjunction with the antenna tower 208) is sectorized, such that it provides three sectors (labeled "Sector 1," "Sector 2," and "Sector 3"). An access device then communicates on a connection via one or more of the cells or sectors of a BTS in accordance with one or more of a family of CDMA protocols. For instance, under IS-2000, each cell or sector will be identified according to a locally unique identifier based on a bit offset within a 16-bit pseudo-random number (PN). An access device operating according to IS-2000 receives essentially the same signal from up to six sectors concurrently, each sector being identified and encoding transmissions according its so-called PN offset. The details of such communications are well-known in the art and not discussed further here.

Signals received from access devices connected via the antenna tower 208 are transmitted back to the BTS 206 via the connection 207.

Unlike the BTS 206, which supplies the antenna tower 208, the BTS 210 is connected instead to a DAS head end 222 via a digital RF connection 211. The digital connection 211 is the same type of signal and physical interface as the connection 207. However, rather than supplying a single transmission tower, the DAS head end 222 splits and distributes the input signal from the BTS among several smaller and remote antenna nodes 224-1, 224-2, 224-3, ..., 224-N, where N is a positive integer. As describe in more detail below, the connections from the DAS head end 222 to each of the remote nodes 224-1, 224-2, 224-3, ..., 224-N are made via low-power digital-optical links 221-1, 221-2, 221-3, ..., 221-N, respectively. Hatch marks interrupting each of the links 221 are meant to represent the remoteness of each node's location with respect to the DAS head end. The remote nodes could be distributed throughout one or more buildings, or across a residential area or small down-town locale or village where a larger antenna tower is impractical and/or impermissible according local zoning ordinances, for instance.

The combination of signals then transmitted from the remote nodes 224-1, 224-2, 224-3, ..., 224-N provides the same signals that would be transmitted from one or more cells or sectors if they were connected to the BTS 210, but spread over a region according to the topological arrangement of the nodes and the splitting and routing of the input signals by the DAS head end (this is discussed further below). Signals received from access devices connected via one or more of the remote antenna nodes are received at the DAS head end, combined, then transmitted back to the BTS 210 via the connection 211, in the same way as in the traditional BTS (e.g., transmissions from the RF module 208 to the BTS 206).

FIG. 2 also illustrates a similar network configuration for Service Provider 2. In this case, a MSC 212 is connected to a BSC 214, which in turn is connected to a BTS 216 and a BTS 220. Similarly to the BTS 206, a traditional BTS 216 is connected to a radio transmission tower 218 via a high-power digital-RF connection 217. Note that for both traditional BTSs, the BTS units (206 and 216) are typically collocated with their respective RF transmission towers. As shown, the BTS 220 connects to a DAS head end 222 via a high-power digital radio connection 213, which again is the same type of connection as the connections 207, 211, and 217. Because the interface between the BTS and DAS head is the same for both the BTS 210 of Service Provider 1 and the BTS 220 of Service Provider 2, both service providers can connect to the common DAS head end and thereby share the same remote antenna node access infrastructure.

While the connections 211 and 213 are of the same type, each carries a signal (or signals) that is (or are) specific to the particular service provider. For example, both service providers could be operating according to IS-2000, but each using a different RF carrier frequency. Alternatively or additionally, one carrier could be operating according to CDMA and the other according to GSM. Other combinations of technologies and RF carriers could be used. In addition, each carrier could have a different configuration of cell or sector identifiers. For instance, the BTS 210 could be configured for three sectors, while the BTS 220 could be configured for a single cell. Any similarities or differences between the two systems are incorporated into their respective signals prior to being modulated onto their respective carriers by their respective BTSs (210 and 220 in this example). The DAS head end just splits and routes the respective signals to the remote antenna nodes, which then transmit the various carrier signals concurrently. Thus, the output of the antenna nodes potentially comprises a mix of CDMA technologies, RF carrier frequencies, and coverage area (e.g., cell or sector) configuration.

Figure 3:
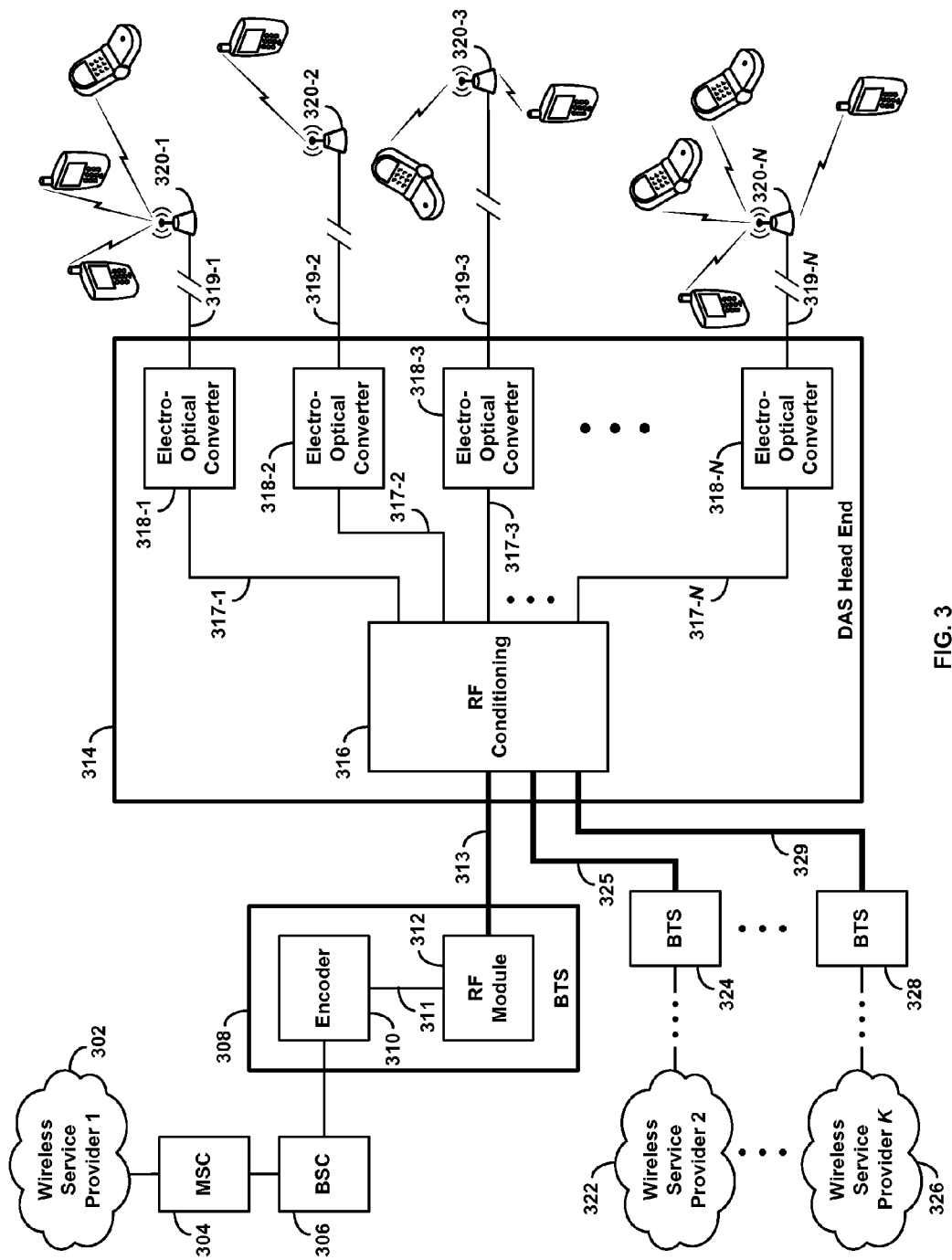
FIG. 3 is an example block diagram of a standard DAS head end.

FIG. 3 shows a block diagram of the example configuration of the standard DAS architecture that depicts additional details, in particular of the DAS head end. It will be appreciated, however, that FIG. 3 is nonetheless still a simplified rendering of what an actual deployment would look like. In this figure, certain network elements have been omitted for the sake of brevity, and other are represented in an abbreviated form. As shown, a network 302 of the wireless Service Provider 1 is connected to a BTS 308 via an MSC 304 and a BSC 306. The BTS comprises an encoder 310 connected to the BSC, and also connected to an RF module 312 via a link 311. Input from the BSC comprises baseband signals from the network delivered on a circuit trunk, such as a Ti, or the like. The input is encoded according to the particular wireless protocol employed. For instance, for a system operating under IS-2000, the input signals are encoded according to CDMA according well-known processing methods and procedures. The encoded baseband signal is input to the RF module, which then modulates it to an RF carrier band and amplifies it for air interface transmission. The output of the RF module is an RF digital-optical signal having a power of order of 20 W, which then transmitted on a high-power digital-optical link 313 to a DAS head end 314.

In accordance with an example embodiment, the DAS head end 314 comprises an RF conditioning module 316 connected to electro-optical converters 318-1, 318-2, 318-3, ..., 318-N, via low-power RF links 317-1, 317-2, 317-3, ..., 317-N. Each electro-optical converter is, in turn, connected to one of several remote antenna nodes 320-1, 320-2, 320-3, ..., 320-N via low-power fiber-optic lines 319-1, 319-2, 319-3, ..., 319-N, respectively. Again, hatch marks interrupting each of the fiber-optic lines 319 are meant to represent the remoteness of each node's location with respect to the DAS head end. The RF conditioning module 316 receives high-power digital-optical input from the network (i.e., from one or more BTSs), and distributes the signal to the remote antenna nodes via the electro-optical converters. More specifically, the RF conditioning module implements one or more forms of splitting of the input signal such that the resultant signal portions each contain a fraction of the input power. Each lower-power signal portion is routed to a specific one or more of the electro-optical converters. Each illustrated electro-optical converter 318 converts its respective input signal 317 to low-power digital-optical signal for transmission to one of the remote nodes 320 via one of the fiber optic links 319. The digital-optical signal carried on each fiber optic link comprises an optical representation of the RF carrier signal to be transmitted by the receiving remote antenna node.

The digital-optical signal received by each remote antenna node drives a low-power radio transmitter in the node, which then generates the RF signal for transmission by the antenna. The resultant transmission is the RF signal from the BTS 308 distributed across the array of the remote node antennas 320-1, 320-2, 320-3, . . . , 320-N.

By way of example, the DAS head end 314 is shown to also be connected to a network 322 of wireless Service Provider 2 and a network 326 of wireless service provider K. Vertical ellipses between these two networks represent other possible wireless service providers that could also be connected to the DAS head end. As depicted in the figure, the network 322 is connected to the BTS 324, which in turn is connected to the DAS head end 314 via a high-power digital-optical link 325. Similarly, the network 326 is connected to the BTS 328, which in turn is connected to the DAS head end 314 via a high-power digital-optical link 329. For the sake of brevity in the figure, the connections between each network and the respective BTSs are drawn with horizontal ellipses to represent other possible equipment and components that may comprise the connection.

The explanation above of the connections and operations with respect to the BTS 308 and the network 302 applies to the networks 322 and 326 as well. The RF conditioning module 316 splits and routes each input signal according to a configuration that applies to that signal and as specified according the source wireless service provider. As such, each electro-optical link 317 comprises a superposition of RF-modulated electrical signals, each on a different carrier frequency. Similarly, the output of each electro-optical converter comprises a superposition of RF-modulated optical signals at the different carrier frequencies. Each antenna node then transmits the superposition of RF signals on the radio-frequency air interface to wireless access devices operating in the aggregate coverage area of the remote nodes. These devices are represented by cartoons of cell phones and PDAs, and the RF air interfaces are represented by lightning-bolt-shaped lines from the antenna nodes to the devices.

In the reverse direction, RF air interface signals received at the remote nodes from wireless access devices are relayed as digital-optical RF signals back to the electro-optical converters on the fiber optic links 319, where they are converted into digital-electric signals and combined by the RF conditioning module 316 for transport back to the BTS 308. When more than one BTS and/or RF carrier is connected to the RF conditioning module, as in the present example, the RF conditioning module may de-multiplex the combined signal according to the RF carrier (or some other distinctive physical criteria or characteristic of the signal), so that each BTS receives its proper combined signal from the DAS head end.

While the DAS head end can allow different service providers to share common wireless access infrastructure, each input BTS must still incorporate an RF module for converting a baseband signal from the network to a high-power RF-modulated passband signal. As noted, the RF module is the same BTS component that provides RF input to the radio tower/transmitter of the traditional BTS. In practical implementations, the RF module accounts for a significant fraction of the cost of a BTS—on the order of 50-70% or more. Thus, while the standard DAS architecture achieves common wireless access infrastructure, the resultant cost savings is offset, at least partially, by the requirement of an RF module in each BTS. Further, the input to the DAS head end is limited to technologies that utilize the high-power RF interface for transport between the BTS and the DAS head end (e.g., the links 313, 325, and 328 in the example of FIG. 3).

b. Remote Radio Head Architecture

Figure 4:
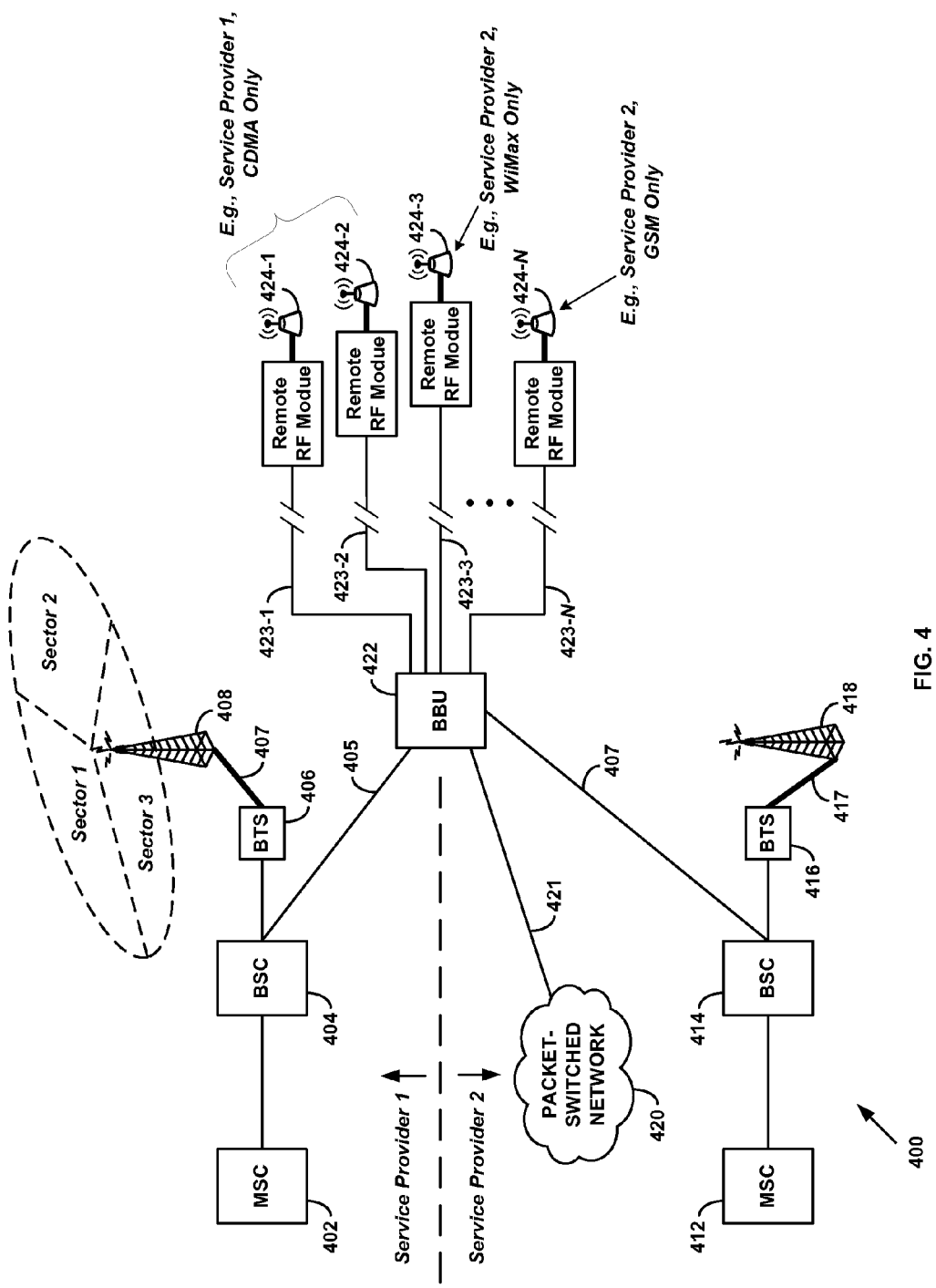
FIG. 4 illustrates an example deployment of an RRH architecture.

A Network 400 in FIG. 4 illustrates a high-level view of an implementation of a distributed antenna system according to an example configuration of a remote radio head (RRH) architecture. As with the example illustrated in FIG. 2, the example RRH implementation of the present illustration is also shown as providing a common access infrastructure for Service Provider 1 and Service Provider 2, although the RRH architecture could support greater or fewer than two service providers. Again, the network of Service Provider 1 includes an MSC 402 that is connected to a BSC 404. In this example, the BSC 404 is connected to a BTS 406, which is a traditional BTS, having a high-power digital radio connection 407 to an antenna tower 408. An RF digital connection 407 again represents the standard interface between the RF module and the radio tower of the traditional BTS. For purposes of illustration, the BTS 406 is shown to include three sectors, as in the corresponding example in FIG. 2.

In the RRH architecture, a baseband unit (BBU) 422 is used instead of a DAS head end to distribute and receive signals from an array of remote antennas. The BBU 422 takes baseband signal input directly from the BSC 404 via a baseband digital link 405, then splits and routes the input baseband signal to one or more remote radio heads 424-2, 424-2, 424-3, . . . , 424-N via low-power digital-optical links 423-2, 423-2, 423-3, . . . , 423-N. As in FIGS. 2 and 3, hatch marks interrupting each of the digital-optical links 423 are meant to represent the remoteness of each node's location with respect to the BBU. The digital-optical links 423 represent one or more standard interfaces that have been defined as part of an industry effort to develop an "open BTS architecture" intended to decentralize BTS architecture and operation. In particular, two standard interfaces that have currently been defined are the Common Public Radio Interface (CPRI) and the Open Base Station Architecture Initiative (OBSAI). Both support optical baseband signals in a frequency range of roughly 600 Megabits per second (Mbps) to 6 Gigabits per second (Gbps), and at a power level of a few milliwatts (mW). By way of example, the digital-optical links 423 could support either or both the CPRI and OBSAI protocols. However, other interface protocols could be used for the deploying links 423.

Each remote radio head comprises a low-power antenna 424 and a remote RF module, each of which provides an analogous function to the RF module of the traditional BTS, but on a smaller scale. As such, the remote RF module takes the input baseband signal (e.g., via either a CPRI or OBSAI interface) and modulates it to a specific carrier band frequency. Note that even though the remote antenna transmits at lower power than a traditional BTS radio tower/transmitter, the output of the remote RF module is nevertheless connected to the low-power antenna via the same type of high-power digital RF link as that between the RF module of the traditional BTS and the BTS radio tower or DAS head end. Thus, the remote RF module does not eliminate the need for high-power amplifiers and other high-power components similar to those of the RF module of the traditional BTS.

FIG. 4 depicts Service Provider 2 as having both a cellular network with a configuration similar to that of Service Provider 1, and a native packet network 420. In this case, an MSC 412 is connected to a BSC 414, which in turn is connected to a traditional BTS 416. The BTS 416 is connected to a radio transmission tower 418 via a high-power digital-RF connection 417. As with the BSC 404, the BSC 414 is connected to the BBU 422 via a digital baseband link 407, and the BBU splits and routes the input baseband signal to one or more remote radio heads 424. As explained below, the BBU does not mix signals from the two service providers, so that the remote radio heads used by the two (or more) service providers are different.

A packet network 420 is also connected to the BBU 422 via a digital baseband link 421, which could represent an interface defined according to one or more versions of IEEE 802.11, for instance. Other protocols could be used as well. The network 420 could be part of (or connected to) a WiMax access network, or the like. As with the other input baseband signals, the BBU will split and route the input baseband signal 421 to one or more remote radio heads 424. Again, the BBU does not mix signals from the packet network 420 with either of the cellular signals from the BSCs 404 or 414, so that each input baseband signal is routed to a different one or more of the remote radio heads 424.

More specifically, because the remote RF module of a remote radio head converts an input baseband signal to a particular RF carrier, the remote radio head cannot transmit a superposition of different RF bands. Consequently, the RRH architecture does not support mixing input baseband signals of different transport technologies or baseband signals that are to be modulated to different RF carriers. Thus, the routing carried out by the BBU of baseband signals input from the network is fixed according to the input source network. This limitation is indicated conceptually by the notations in FIG. 4 specifying the service providers and technologies associated with each remote radio head. For example, the remote radio heads 424-1 and 424-2 are labeled as being associated with CDMA from Service Provider 1 only. Further, the remote radio head 424-3 is labeled as being associated with WiMax from Service Provider 2 only, while the radio head 424-N is labeled as being associated with GSM from Service Provider 2 only. Other combinations of access and transport technologies could be used as well.

Figure 5:
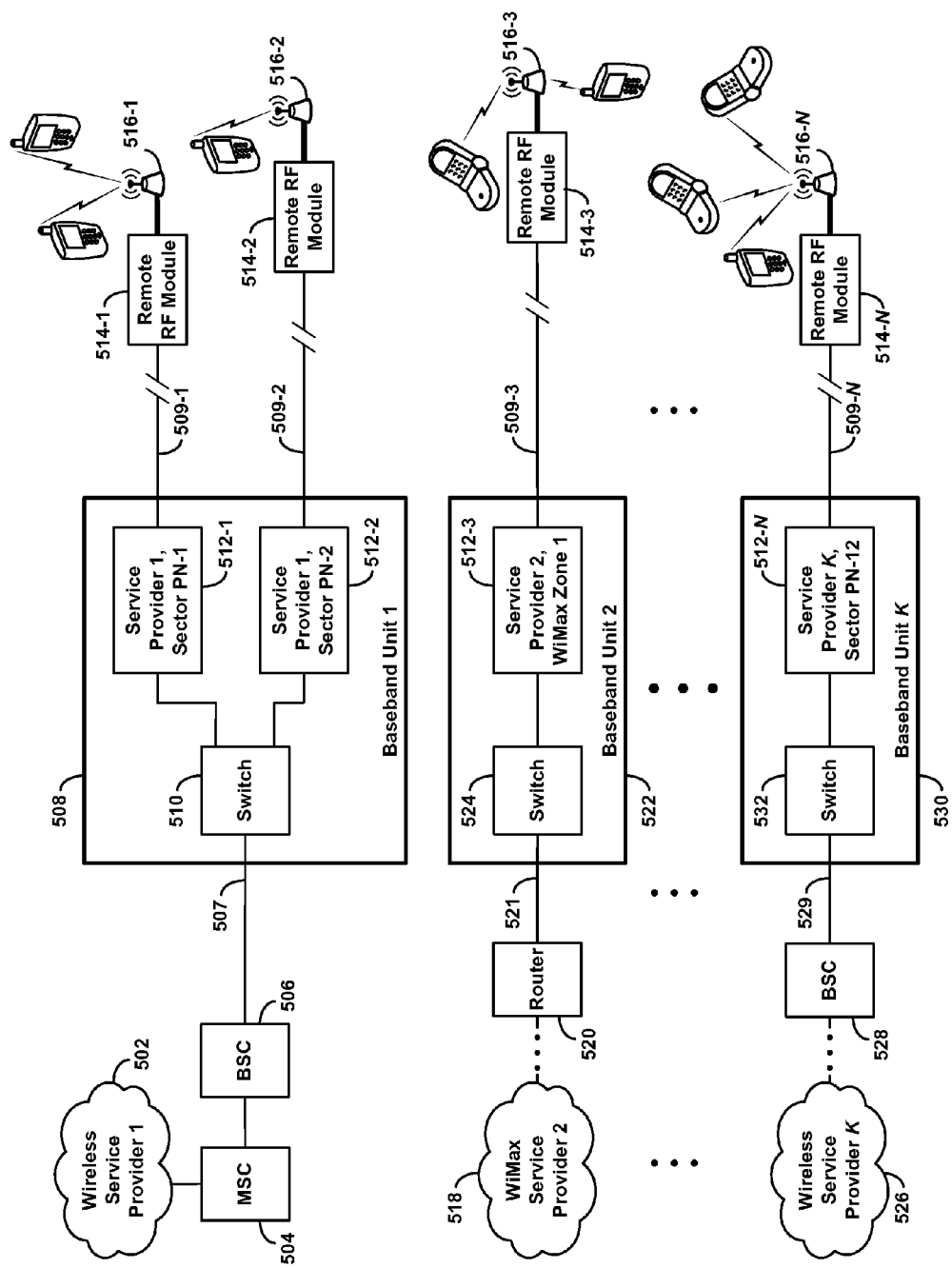
FIG. 5 is an example block diagram of a BBU in an RRH architecture.

FIG. 5 shows a block diagram of the example configuration of the RRH architecture that depicts additional details, in particular of the BBU. As with FIG. 3, certain network elements have been omitted for the sake of brevity, and others are represented in an abbreviated form. By way of example, three service providers are included in FIG. 5. A network 502 of Wireless Service Provider 1 is connected to a BSC 506 via an MSC 504. Digital baseband output signals from the BSC 506 are then transmitted via a digital interface 507 to a BBU 508 (labeled "Baseband Unit 1"). A network 518 of WiMax Service Provider 2 is connected to a router 520, which in turn is connected to a BBU 522 (labeled "Baseband Unit 2") via a digital baseband interface 521. The horizontal ellipses in the connection between the network 518 and the router 520 represent the possible presence of other packet routing/processing components in the connection path. A network 526 of Wireless Service Provider K is connected to a BSC 528, which in turn is connected to a BBU 530 (labeled "Baseband Unit K") via a digital baseband interface 529. Again, horizontal ellipses in the connection between the network 526 and the BSC 528 represent the possible presence of other transport elements in the connection path.

The configuration depicted of the three service providers in FIG. 5 illustrates the limitations of the RRH architecture with respect to combining signals and transport technologies within a common access infrastructure. In particular, the single baseband unit 422 in FIG. 4 is now shown in FIG. 5 to be three separate BBUs 508, 522, and 530. Each BBU includes elements for splitting and routing the input digital baseband signal to dedicated remote radio heads. More specifically, the BBU 508 includes a switch 510 that splits or switches the input signal according to a fixed routing configuration. By way of example, the switch 510 is connected to two output paths, one to Sector PN-1 of Service Provider 1, and the other to Sector PN-2 of Service Provider 1 (wherein "Sector PN-1" and "Sector PN-2" are identifying labels for the purposes of the present discussion, and not necessarily indicative of actual PN offsets). Each output path from the switch is connected to a different optical interface 512-1 or 512-2, and each interface is then connected a different remote radio head 516-1 or 516-2, respectively, via a fiber optic link 509-1 or 509-2, respectively, to a different remote RF module 514-1 and 514-2. Each remote RF module is dedicated to one of the remote radio heads.

The baseband unit 522 includes a switch 524 that routes output to an optical interface 512-3, which is then connected to a remote radio head 516-3 via a fiber optic link 509-3 to a remote RF module 514-3. Similarly, the BBU 530 includes a switch 532 that routes output to an optical interface 512-N, which is then connected to a remote radio head 516-N via a fiber optic link 509-N to a remote RF module 514-N. The remote RF module 514-3 is dedicated to the RRH 516-3, while the remote RF module 514-N is dedicated to the RRH 516-N. The depiction of just a single optical interface and corresponding digital-optical link in each of the BBUs 522 and 530 is for purposes of illustration only. In practice each BBU might support up to a particular number (e.g., 16 or 24) of remote radio heads.

As in FIG. 4, the fiber optic links 509 could support CPRI or OBSAI, as well as possibly other standard protocols for an open BTS architecture. For example, the BBU 508 might support CPRI, while the other two BBUs might support OBSAI. Other arrangements are possible as well. In practice, each separate BBU could be a distinct, self-contained piece of equipment installed in a rack with the other BBUs. Thus, a certain degree of common access infrastructure might be achieved by configuring several single-unit BBUs in a common rack at a single location. However, each single-unit BBU would serve a dedicated array of remote radio heads, such that there would be no concurrent sharing of the array among different service providers, different access technologies (e.g., CDMA, GSM, WiMax, etc.), or different RF carriers.

In spite of the configuration limitations of the RRH architecture, it still has the ability to provide access in locations where a traditional BTS cannot, for one reason or another, be deployed. Moreover, the cost of a BBU can be significantly less than that of a traditional BTS, especially because the need for a large RF module is obviated. However, some of the cost advantage may be offset by the requirement of a dedicated remote RF module associate with (or part of) each remote radio head. While the cost of a remote RF module is less than that of an RF module in a traditional BTS, it is still a fairly high fraction of the total cost of a remote radio head. In addition, since each RRH includes (or requires) a remote RF module, the total cost of remote RF modules scales with the number of remote radio heads deployed.

2. Flexible DAS

Various embodiments of the present system provide one or more implementations of a flexible DAS head end that incorporates advantageous aspects of both the standard DAS architecture and of the RRH architecture, while at the same time overcoming limitations of each type of architecture, as well as of the cost and complexity of implementing both approaches simultaneously. For purposes of illustration and convenience in discussion, embodiments of a flexible DAS head end are described below first in terms of an apparatus and subsequently in terms of a method. It will be appreciated from the following discussion that the method largely provides an operational representation of the apparatus.

a. Apparatus

Figure 6:
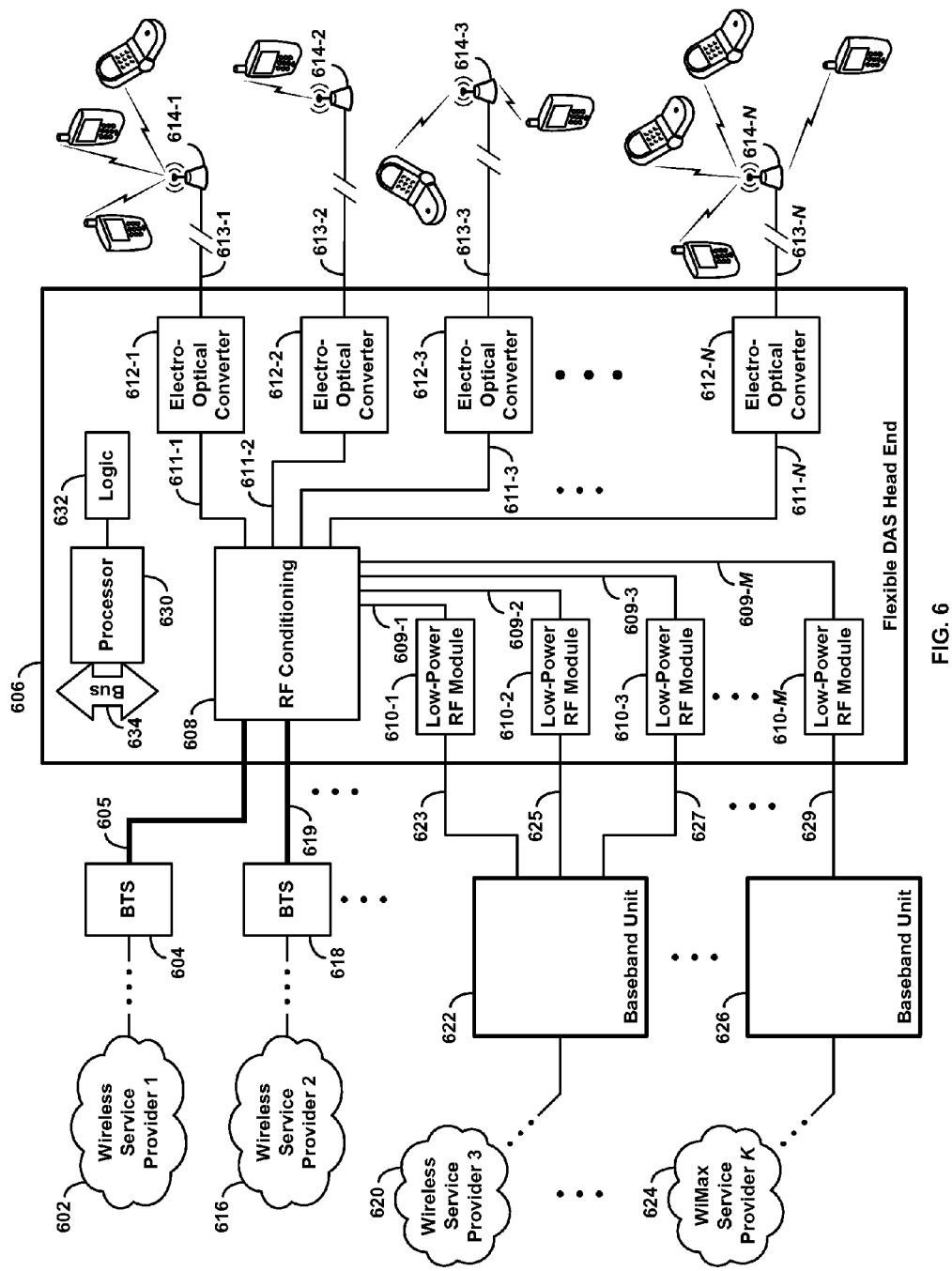
FIG. 6 is an example block diagram of a flexible DAS head end.

FIG. 6 depicts an example embodiment of a flexible DAS head end apparatus that advantageously provides a true, common wireless access infrastructure that can be shared concurrently among multiple service providers, multiple transport technologies, multiple RF carriers, and multiple network-side interface protocols. The particular number and types of service providers and the particular configuration of remote antenna nodes shown in FIG. 6 are intended to illustrate the example embodiment, and should not be viewed as limiting with respect to the present invention or embodiments thereof. As with FIGS. 3 and 5, certain network elements have been omitted from FIG. 6 for the sake of brevity, and others are represented in an abbreviated form.

FIG. 6 shows four of K service providers, Wireless Service Provider 1, Wireless Service Provider 2, Wireless Service Provider 3, and WiMax Service Provider K, wherein vertical ellipses between Wireless Service Provider 3 and WiMax Service Provider K indicate possibly other service providers that share the common flexible DAS infrastructure. In the example deployment shown, a network 602 of Wireless Service Provider 1 is connected to a flexible DAS head end 606 by way of a BTS 604 and an interface 605 between the BTS and the flexible DAS head end. Similarly, a network 616 of Wireless Service Provider 2 is connected to the flexible DAS head end 606 by way of a BTS 618 and an interface 619 between the BTS and the flexible DAS head end. Each of the interfaces 605 and 619 represent a high-power digital-RF connection such as those discussed above (e.g., link 217 in FIG. 2). The vertical ellipses below the BTS 618 and the link 619 represent other possible cellular network connections between the network 616 and the flexible DAS head end. The horizontal ellipses between each of the networks and their respective BTSs again represent other possible transport elements in the connection path.

Continuing with the description of FIG. 6, a network 620 of Wireless Service Provider 3 is connected to the flexible DAS head end 606 by way of a baseband unit 622 and three fiber optic links 623, 625, and 627 between the BBU and the flexible DAS head end. While the baseband unit 622 is depicted as a single block in FIG. 6, in practice it will comprise elements similar to those of the BBUs 508, 522, and 530 in FIG. 5, for example. Further, the configuration of three fiber optic links between the BBU 622 and the flexible DAS head end 606 serves as an example, and more or fewer connections could be used. Similarly a network 624 of WiMax Service Provider K is connected to the flexible DAS head end 606 by way of a baseband unit 626 and one fiber optic link 629 between the BBU and the flexible DAS head end. Again, the BBU 626 is depicted without any internal details, and the depiction of a single fiber optic link 629 is just an example. The fiber optic links 623, 625, 627, and 629 could each support CPRI or OBSAI (or some other standard protocol). Once more, ellipses in the connection path between the networks and the respective BBUs represent other possible transport elements.

In accordance with an example embodiment, the flexible DAS head end 606 comprises an RF conditioning module 608, up to M low-power RF modules 610-1, 610-2, 610-3, ..., and 610-M, and up to N electro-optical converters 612-1, 612-2, 612-3, ..., and 612-N. The low-power RF modules 610 are connected to the RF conditioning module by low-power digital-RF links 609-1, 609-2, 609-3, ..., and 609-M, respectively. Also as shown, the RF conditioning module 608 is connected to the electro-optical converters 612 via low-power RF links 611-1, 611-2, 611-3, ..., and 611-N. The various vertical ellipses in the flexible DAS head end represent possibly additional elements of the type spanned by the ellipses.

The RF conditioning module 608 functions similarly to that in the standard DAS head end shown in FIG. 3, except that the RF conditioning module 608 has additional connections to the low-power RF modules 610. Thus, in addition to being connected to high-power digital-RF lines 605 and 619, the RF conditioning module 608 receives lower-power digital RF signals from the low-power RF modules via the low-power digital-RF links 609. The RF conditioning module splits and routes the aggregate inputs from both the BTSs and the low-power RF modules to the array of remote antenna nodes 614-1, 614-2, 614-3, ..., 614-N in a manner similar to that described in connection with the standard DAS shown in FIG. 3. Thus, the low-power RF links 611-1, 611-2, 611-3, ..., and 611-N are converted by the electro-optical converters 612 to low-power optical-digital signals that carry the RF signals to the remote antenna nodes.

Because the input digital-optical signals from the BBU are modulated to appropriate RF carriers before being supplied to the RF conditioning module 608, the flexible DAS head end is advantageously able to concurrently apply the splitting, mixing, and routing to signals from the BTSs and the BBUs. The signals are then supplied to the array of remote antennas 614 and transmitted on their respective air interfaces to wireless access devices operating in the coverage area defined by the array. As a result, the flexible DAS head end achieves the broadest range of versatility of transport technologies on multiple RF carriers for multiple service providers, all on a commonly-shared access infrastructure. Moreover, the flexible DAS head end uses low-power RF modules to convert the baseband signals from BBUs to RF passband signals, thereby eliminating the need for the costly remote RF modules of the RRH architecture. Further, while inclusion of the low-power RF modules in the flexible DAS head end makes it generally more expensive to construct than the standard DAS head end, the low-power RF modules can typically be acquired or built at a fraction of the cost of the remote RF modules of the RRH solution. Thus, taking into account the increased versatility of the flexible DAS head and especially its ability to be truly shared among service providers, the flexible DAS head end is ultimately a lower-cost solution than either the standard DAS architecture or the RRH architecture.

In the reverse direction, from the wireless access devices to the network, signals received at the RF conditioning module are de-multiplexed to the appropriate destinations in much the same manner as either of the standard DAS head end or the BBUs in the RRH architecture.

The RF conditioning module 608 in the flexible DAS head end 606 may be implemented in a variety of ways, and with varying levels of sophistication of switching and routing functionality. In a simple form, the RF conditioning module could be arranged to split incoming signals from BTSs and BBUs into a number of signal portions, and then superpose particular signal portions on particular digital-electrical links 611 according to a static configuration. The splitting and static superposition configurations could be implemented using simple (e.g., passive) splitters and combiners with inputs and outputs appropriately connected.

A more complex form of the RF conditioning module could be implemented as a matrix of inputs and outputs that could be connected according to a desired routing of input RF signals to remote antenna nodes. The logical design of such a matrix could be similar to that of a switching fabric used in a circuit-switched network, for example. Configuring such a matrix could comprise a semi-static provisioning of inputs to outputs, or even encompass dynamic functionality for purposes of load balancing. For instance, by monitoring the traffic load (e.g., the number of wireless access devices) on each antenna node, the RF conditioning matrix could periodically or continually adjust the amount of transmission power delivered to the antenna nodes on their respective digital-optical links 613.

In an alternative embodiment of the flexible DAS head end, an increased degree of sophistication can be introduced into load balancing and other dynamic adjustments of switching and routing through the addition of a smart antenna interface. An example of such an alternative embodiment is shown in an apparatus in FIG. 7. The flexible DAS head end 704 in this figure is largely identical to that in FIG. 6 except for the inclusion of a smart antenna interface 706 that is connected to a RF conditioning module 708 by way of a control line 707. In addition, the smart antenna interface is connected to each network input source (BTS and/or BBU), as explained below. For convenience in comparing FIGS. 6 and 7, like components in are labeled with like numbers, except for the leading number (e.g., low-power RF module 610-1 in FIG. 6 corresponds to low-power RF module 710-1 in FIG. 7). For components in FIG. 7 that are not explicitly discussed below, the discussion of the corresponding components in FIG. 6 apply.

Figure 7:
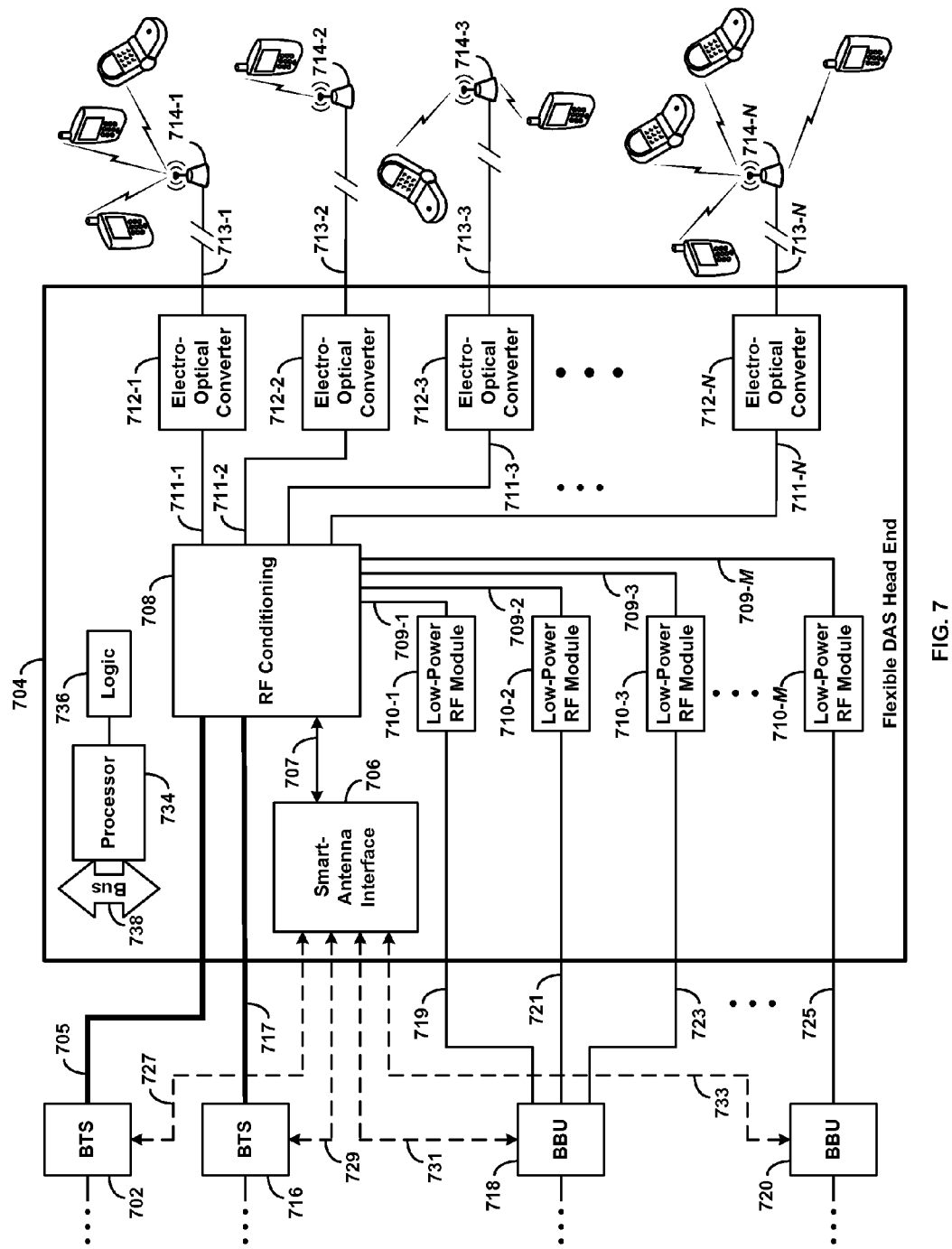
FIG. 7 is an example block diagram of a flexible DAS head end that includes a smart antenna interface.

In FIG. 7, individual service providers are omitted for the sake of brevity, and only BTSs or BBUs are shown, each representing a connection to a service provider's network. Specifically, the BTSs 702 and 716 are connected to the RF conditioning module 708 of the flexible DAS head end 704 via high-power digital-RF links 705 and 717, respectively. Also as shown, a BBU 718 is connected to the RF conditioning module via fiber optic links 719, 721, and 723, while a BBU 720 in connected to the RF conditioning module via a fiber optic link 725. Each fiber optic link could, again, support interfaces compliant with CPRI or OBSAI (or some other similar protocol).

The smart antenna interface 706 has a control connection 727 to the BTS 702 (the connection shown as a dashed line with arrows at both ends). Signals on this connection allow the smart antenna interface to send traffic and load information regarding the remote antenna nodes to the BTS. The BTS can then adjust transmission power to its various sectors, which in turn affect how power is distributed to the remote nodes. A control line 729 supports the same function between the smart antenna interface 706 and the BTS 716. Similarly, control lines 731 and 733 support this function for the BBUs 718 and 720, respectively.

In addition to allowing the network signal source (BTS and/or BBU) adjust power to sectors or other forms of coverage areas, the smart antenna interface can be arranged to take input control commands that cause it to adjust load balancing by the RF conditioning module via the control line 707. The ability of make such dynamic adjustments are supported by a dynamically adjustable RF conditioning matrix.

It will be appreciated that the embodiments of the flexible DAS head end illustrated by way of example in FIGS. 6 and 7 can include other components in addition to the RF conditioning module, low-power RF modules, electro-optical converters, and smart antenna interface discussed above. In particular, each could include one or more general-purpose and/or special-purpose computer processors, as represented by processor 630 in FIG. 6 and processor 734 in FIG. 7; machine logic executable by the one or more computer processors to carry out the functions, steps, and procedures of the various embodiments described herein, as represented by logic 632 in FIG. 6 and logic 736 in FIG. 7; and one or more communicative connections between the one or more processors and other components of the flexible DAS head end, as represented by bus 634 in FIG. 6 and bus 738 in FIG. 7. Moreover, it would be understood by one of skill in the art how to integrate the elements and components illustrated by way of example in FIGS. 6 and 7 (with other possible components) to implement an embodiment of a flexible DAS head end.

More generally, an embodiment of a flexible DAS head end could be implemented as a combination of one or more integrated and/or distributed computing platforms, each comprising one or more general-purpose and/or special-purpose computer processors, one or more forms of computer-readable storage (e.g., disks drives, random access memory, etc.), one or more communication interfaces for interconnection between elements and the network, and operable to transmit and receive the communications and messages described herein, and one or more forms of machine logic executable by the one or more computer processors to carry out the functions, steps, and procedures of the various embodiments of the present invention described herein. It will further be appreciated that the machine logic could take the form of computer software programs and related data (e.g., machine-language instructions and program and user data) stored in the one or more forms of computer-readable storage (not explicitly shown in FIGS. 6 and 7), hardware-based logic, firmware logic, or any combination thereof.

The flexible DAS head end could also include one or more signal amplifiers, digital signal processors, digital to analog converters, and analog to digital converters, any or all of which could operate on and/or process electrical, RF, or optical physical signals.

b. Method

Figure 8:
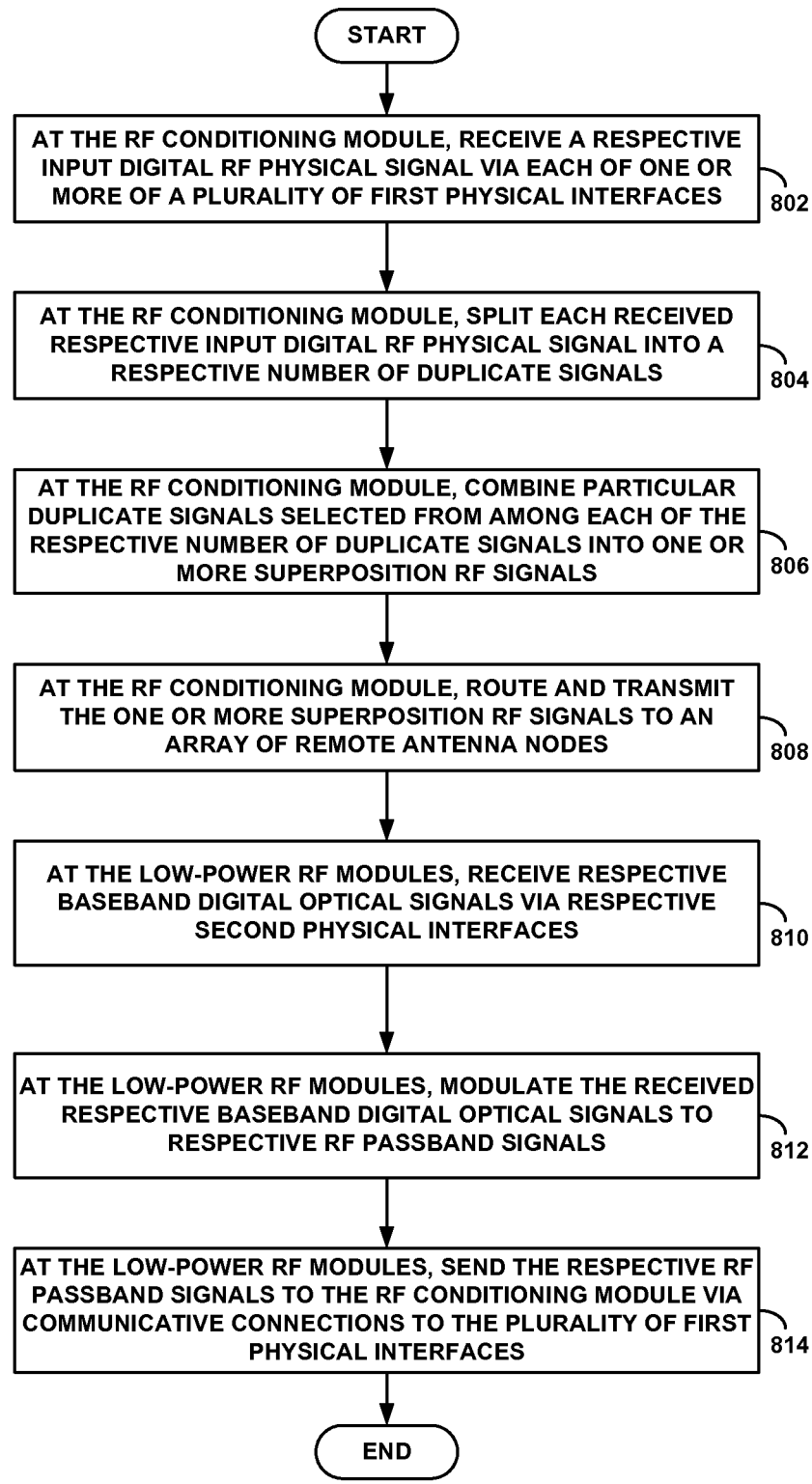
FIG. 8 is a flowchart illustrating a method of operation of a flexible DAS head end.

An example embodiment of a method of operation of a flexible DAS head end is illustrated in the form of a flowchart in FIG. 8. By way of example, the illustrated method could be implemented and carried out by either or both of the example flexible DAS head end apparatuses depicted in FIGS. 6 and 7.

At step 802, the RF conditioning module receives a respective input digital RF physical signal via each of one or more of a plurality of first physical interfaces associated with the RF conditioning module. Referring back to FIGS. 6 and 7, the first physical interfaces correspond to the points of connection at the RF conditioning module of high-power digital-RF links 605, 619 (FIGS. 6) and 705, 717 (FIG. 7) from BTSs in wireless service provider networks. The first physical interfaces also correspond to the points of connection at the RF conditioning module of the low-power digital-RF links 609-1, 609-2, 609-3, . . . , and 609-M (FIG. 6) and low-power digital-RF links 709-1, 709-2, 709-3, . . . , and 709-M (FIG. 7) from the respective low-power RF modules shown in the figures. More generally, at least one of the plurality of first physical interfaces is taken to be configured to receive an input digital RF physical signal from a BTS device in a wireless service provider network that operates according to a CDMA family of protocols. In practice, the digital RF physical signal will be a passband signal; i.e., a signal that has been modulated to a particular RF carrier frequency (passband).

At step 804, the RF conditioning module splits each received respective input digital RF physical signal into a respective number of duplicate signals. Again referring to FIGS. 6 and 7, the flexible DAS head end apparatus 606 (FIG. 6) or 704 (FIG. 7) is configured to be connected to an array or remote antenna nodes (614 in FIG. 6 and 714 in FIG. 7) comprising a number of antenna nodes ("N" in each figure). In accordance with the example embodiment, the RF conditioning module will split each received respective input digital RF physical signal into a number of duplicate signals that equals the number of antenna nodes.

At step 806, the RF conditioning module combines particular duplicate signals selected from among each of the respective number of duplicate signals into one or more superposition RF signals. In accordance with the example embodiment, the number of superposition RF signals will equal the number of antenna nodes, and each superposition RF signal will include one duplicate signal from each of the split input digital RF physical signals. As such, each superposition RF signal will include a number of superposition signal elements equal to the number of input digital RF physical signals. For example, if there are five input digital RF physical signals and 10 antenna nodes, each of the five input digital RF physical signals will be split into 10 duplicate signals, and 10 superposition RF signals will be constructed, each including five superposition signal elements.

In further accordance with the example embodiment, each input digital RF physical signal will be a passband signal having a different RF carrier frequency. Thus, each set of duplicate signals corresponding to a given input digital RF physical signal will have a different RF carrier frequency than every other set of duplicate signals corresponding to a different input digital RF physical signal. With this arrangement, the superposition signal elements of each superposition RF signal will occupy different passbands, and each superposition RF signal will therefore carry non-interfering superposition elements. It will be appreciated that other splitting and superposition schemes could be used. For example, some superposition signals could include superposition signal elements from each input digital RF physical signal, while others might include superposition signal elements from only a subset of all of the input digital RF physical signals.

At step 808, the RF conditioning module routes and transmits the one or more superposition RF signals generated at step 806 to the array of remote antenna nodes. Referring once more to FIGS. 6 and 7, the flexible DAS head end includes a plurality of electro-optical converters (612 in FIG. 6 and 712 in FIG. 7) each being connected to the RF conditioning module via one of a plurality of third physical interfaces of the RF conditioning module. Also as discussed, each given electro-optical converter is configured to be connected to one of the antenna nodes via a respective fourth physical interface of the given electro-optical converter (the fourth physical interface of each electro-optical converter corresponding to the point of connection at the converter to a respective antenna node). In accordance with the example embodiment, the RF conditioning module will route and transmit the one or more superposition RF signals to the array of remote antenna nodes by routing and sending each of the one or more superposition RF signals to the one or more of the plurality of electro-optical converters via one of the plurality of third physical interfaces.

The example method therefore also comprises receiving one of the one or more superposition RF signals from the RF conditioning module at each electro-optical converter. In further accordance with the example method, each of the one or more of the plurality of electro-optical converters will convert the received one of the one or more superposition RF signals into an optical superposition RF signal, and then each of the one or more of the plurality of electro-optical converters will transmit the optical superposition RF signal to the antenna node of the array of remote antenna nodes via an associated respective fourth physical interface.

As discussed above, the flexible DAS head end also comprises one or more low-power RF modules. In accordance with the example embodiment, each low-power RF module includes a respective second interface that is configured to operate according to either or both CPRI or OBSAI, and to be connected to a BBU device in a wireless service provider network. At step 810, each of one or more of the one or more low-power RF modules receives a respective baseband digital optical signal via its respective second physical interface. Thus, receiving a respective baseband digital optical signal at a given low-power RF module comprises the given module receiving the baseband digital optical signal from a BBU device via the given module's respective second physical interface.

At step 812, each of the one or more of the one or more low-power RF modules modulates the received respective baseband digital optical signal to a respective RF passband signal. In accordance with the example embodiment, each low-power RF module that receives a respective baseband digital optical signal will modulate the received signal to a different passband (i.e., a different carrier frequency).

Finally, at step 814, each of the one or more of the one or more low-power RF modules sends the respective RF passband signal to the RF conditioning module via a communicative connection to the one of the plurality of first physical interfaces as one of the respective input digital RF physical signals. Thus, in accordance with the example embodiment, at least one of the input digital RF physical signals received at the RF conditioning module at step 802 corresponds to an RF passband signal output from a low-power RF module. As noted above, the connections from the low-power RF modules to the plurality of first interfaces of the RF conditioning module correspond to the low-power digital-RF links 609 in FIG. 6 and low-power digital-RF links 709 in FIG. 7.

Although it is not explicitly depicted in the flowchart of FIG. 8, the method could further comprise aspects related to the smart antenna interface of the embodiment of the apparatus illustrated in FIG. 7. Specifically, the method could further comprise receiving at the smart antenna interface traffic load information from either or both of a BTS device and the BBU device, and then causing the RF conditioning module to adjust a distribution of transmission power applied to the one or more superposition RF signals that the RF conditioning module routes and transmits to the array of remote antenna nodes. As such, this aspect of the method describes the operation of load-balancing via the smart antenna interface.

The method could also include aspects related to receiving and processing signals in the reverse direction from the antenna nodes, again not shown in FIG. 8. Specifically, reverse direction operation could include: at the RF conditioning module, receiving respective reverse superposition RF signals from one or more remote antenna nodes of the array of antenna nodes; at the RF conditioning module, deconstructing each of the received respective superposition RF signals into a one or more respective reverse passband signals; and at the RF conditioning module, routing and transmitting each of the one or more respective reverse passband signals to a respective destination, wherein the respective destination is either or both of the BTS device and the BBU device.

In the discussion of FIG. 8, the terms "first" and "second" as applied to "interfaces" are used as identifying labels, and not meant to imply any numerical ordering (although a numerical ordering is not necessarily excluded). It will also be appreciated that the steps of FIG. 8 are shown by way of example, and that additional and/or alternative steps or alternative ordering of steps could be carried out and still remain within the scope and spirit of the present invention or embodiments thereof.

3. Conclusion

An example of an embodiment of the present invention has been described above. Those skilled in the art will understand, however, that changes and modifications may be made to the embodiment described without departing from the true scope and spirit of the invention, which is defined by the claims.

What is claimed:

1. An apparatus comprising:
    a radio frequency (RF) conditioning module having a plurality of first physical interfaces and being configured to:
        receive respective input digital RF physical signals via at least two of the plurality of first physical interfaces, wherein the respective input digital RF physical signals include a plurality of RF base transceiver station (BTS) signals,
        split each received respective input digital RF physical signal into a respective number of duplicate signals,
        combine particular duplicate signals selected from among each of the respective number of duplicate signals into one or more superposition RF signals,
        and route and transmit the one or more superposition RF signals to an array of remote antenna nodes to which the apparatus is configured to be communicatively coupled; and
    one or more low-power RF modules each having a communicative connection to a respective one of the plurality of first physical interfaces, and each configured to:
        receive respective baseband digital optical signals via a respective second physical interface, wherein the respective baseband digital optical signals include a plurality of baseband signals in a baseband frequency range,
        modulate the received respective baseband digital optical signal to a respective RF passband signal,
        and send the respective RF passband signal to the RF conditioning module via the communicative connection to the one of the plurality of first physical interfaces as one of the respective input digital RF physical signals.

2. The apparatus of claim 1, wherein at least one of the plurality of first physical interfaces is configured to receive an input digital RF physical signal from a base transceiver station (BTS) device in a wireless service provider network that operates according to a CDMA family of protocols.

3. The apparatus of claim 2, wherein the input digital RF physical signal from the BTS device is a passband signal.

4. The apparatus of claim 2, wherein the respective second physical interface is configured to receive a digital signal from at least one of a base station controller in a wireless service provider network and a network routing device in a wireless service provider network.

5. The apparatus of claim 4, further comprising a smart antenna interface having a communicative connection with the RF conditioning module and being configured to:
    receive traffic load information from at least one of the BTS device and the BBU device; and
    based on the received traffic load information, cause the RF conditioning module to adjust a distribution of transmission power applied to the one or more superposition RF signals that the RF conditioning module routes and transmits to the array of remote antenna nodes.

6. The apparatus of claim 4, wherein the RF conditioning module is further configured to:
    receive respective reverse superposition RF signals from one or more remote antenna nodes of the array of antenna nodes;
    deconstruct each of the received respective superposition RF signals into a one or more respective reverse passband signals; and
    route and transmit each of the one or more respective reverse passband signals to a respective destination, wherein the respective destination is selected from the group consisting of the BTS device, and the BBU device.

7. The apparatus of claim 1, wherein the array of remote antenna nodes comprises a number of antenna nodes,
    and wherein the RF conditioning module is configured to split each received respective input digital RF physical signal into a respective number of duplicate signals by being configured to:
    split each received respective input digital RF physical signal into a number of duplicate signals that equals the number of antenna nodes.

8. The apparatus of claim 7, wherein the RF conditioning module is configured to combine particular duplicate signals selected from among each of the respective number of duplicate signals into one or more superposition RF signals by being configured to:
    combine one of the number of duplicate signals from each split respective input digital RF physical signal into each of a number of superposition RF signals, wherein the number of superposition RF signals equals the number of antenna nodes.

9. The apparatus of claim 1, further comprising a plurality of electrooptical converters each having a communicative connection to one of a plurality of third physical interfaces of the RF conditioning module, and each given electro-optical converter of the plurality of electro-optical converters being configured to:
    receive one of the one or more superposition RF signals from the RF conditioning module;
    convert the received one of the one or more superposition RF signals into an optical superposition RF signal; and
    transmit the optical superposition RF signal to an antenna node of the array of remote antenna nodes via a respective fourth physical interface of the given electro-optical converter that is configured for communication with the antenna node.

10. The apparatus of claim 9, wherein the RF conditioning module is configured to route and transmit the one or more superposition RF signals to the array of remote antenna nodes by being configured to:
    route and send each of the one or more superposition RF signals to one of the plurality of electro-optical converters via one of the plurality of third physical interfaces.

11. An apparatus comprising:
    a radio frequency (RF) conditioning module having a plurality of first physical interfaces;
    one or more low-power RF modules each having a communicative connection to one of the plurality of first physical interfaces;
    a processor; and
    machine logic executable by the processor to cause the apparatus to:
        receive respective input digital RF physical signals via at least two of the plurality of first physical interfaces of the RF conditioning module, wherein the respective input digital RF physical signals include a plurality of RF base transceiver station (BTS) signals,
        at the RF conditioning module, split each received respective input digital RF physical signal into a respective number of duplicate signals, at the RF conditioning module, combine particular duplicate signals selected from among each of the respective number of duplicate signals into one or more superposition RF signals, at the RF conditioning module, route and transmit the one or more superposition RF signals to an array of remote antenna nodes to which the apparatus is configured to be communicatively coupled, at a given one of the one or more low-power RF modules, receive baseband digital optical signals via a respective second physical interface, wherein the baseband digital optical signals include a plurality of baseband signals in a baseband frequency range, at the given one of the one or more low-power RF modules, modulate the received respective baseband digital optical signals to an RF passband signal, and at the given one of the one or more low-power RF modules, send the RF passband signal to the RF conditioning module via the communicative connection to the one of the plurality of first physical interfaces as one of the respective input digital RF physical signals.

12. The apparatus of claim 11, wherein at least one of the plurality of first physical interfaces is configured to receive an input digital RF physical signal from a base transceiver station (BTS) device in a wireless service provider network that operates according to a CDMA family of protocols.

13. The apparatus of claim 12, wherein the input digital RF physical signal from the BTS device is a passband signal.

14. The apparatus of claim 12, wherein the second physical interface is configured to receive a digital signal from at least one of a base station controller in a wireless service provider network and a network routing device in a wireless service provider network.

15. The apparatus of claim 14, further comprising a smart antenna interface having a communicative connection with the RF conditioning module,
wherein the machine logic is executable by the processor to further cause the apparatus to:
at the smart antenna interface, receive traffic load information from at least one of the BTS device and the BBU device; and
at the smart antenna interface, based on the received traffic load information, cause the RF conditioning module to adjust a distribution of transmission power applied to the one or more superposition RF signals that the RF conditioning module routes and transmits to the array of remote antenna nodes.

16. The apparatus of claim 14, wherein the machine logic is executable by the processor to further cause the apparatus to:
at the RF conditioning module, receive respective reverse superposition RF signals from one or more remote antenna nodes of the array of antenna nodes;
at the RF conditioning module, deconstruct each of the received respective superposition RF signals into a one or more respective reverse passband signals; and
at the RF conditioning module, route and transmit each of the one or more respective reverse passband signals to a respective destination, wherein the respective destination is selected from the group consisting of the BTS device, and the BBU device.

17. The apparatus of claim 11, further comprising a plurality of electrooptical converters each having a communicative connection to one of a plurality of third physical interfaces of the RF conditioning module,
wherein the machine logic is executable by the processor to further cause the apparatus to:

at a given one of the plurality of electro-optical converters, receive one of the one or more superposition RF signals from the RF conditioning module;

at the given one of the plurality of electro-optical converters, convert the received one of the one or more superposition RF signals into an optical superposition RF signal; and at the given one of the plurality of electro-optical converters, transmit the optical superposition RF signal to an antenna node of the array of remote antenna nodes via a respective fourth physical interface of the given one of the electro-optical converters that is configured for communication with the antenna node.

18. The apparatus of claim 11, wherein the machine logic is at least one of (i) software instructions stored in machine readable memory accessible by the processor, (ii) hardware logic, and (iii) firmware logic.

19. In an apparatus comprising (i) a radio frequency (RF) conditioning module having a plurality of first physical interfaces and (ii) one or more lowpower RF modules each having a communicative connection to one of the plurality of first physical interfaces, a method comprising:
at the RF conditioning module, receiving respective input digital RF physical signals via at least two of the plurality of first physical interfaces, wherein the respective input digital RF physical signals include a plurality of RF base transceiver station (BTS) signals;
at the RF conditioning module, splitting each received respective input digital RF physical signal into a respective number of duplicate signals;
at the RF conditioning module, combining particular duplicate signals selected from among each of the respective number of duplicate signals into one or more superposition RF signals;
at the RF conditioning module, routing and transmitting the one or more superposition RF signals to an array of remote antenna nodes to which the apparatus is communicatively coupled;
at a given one or more of the one or more low-power RF modules, receiving respective baseband digital optical signals via a respective second physical interface, wherein the respective baseband digital optical signals include a plurality of baseband signals in a baseband frequency range;
at the given one or more of the one or more low-power RF modules, modulating the received respective baseband digital optical signals to a respective RF passband signal; and
at the given one or more of the one or more low-power RF modules, sending the respective RF passband signal to the RF conditioning module via the communicative connection to the one of the plurality of first physical interfaces as one of the respective input digital RF physical signals.

20. The method of claim 19, wherein receiving the respective input digital RF physical signals via the at least two of the plurality of first physical interfaces comprises receiving at least one input digital RF physical signal from a base transceiver station (BTS) device in a wireless service provider network that operates according to a CDMA family of protocols.

21. The method of claim 20, wherein the at least one input digital RF physical signal from the BTS device is a passband signal.

22. The method of claim 20, wherein receiving the respective baseband digital optical signal via the respective second physical interface comprises receiving a digital signal from at least one of a base station controller in a wireless service provider network and a network routing device in a wireless service provider network.

23. The method of claim 22, wherein the apparatus further comprises a smart antenna interface having a communicative connection with the RF conditioning module,
and wherein the method further comprises:
at the smart antenna interface, receiving traffic load information from at least one of the BTS device and the BBU device; and
at the smart antenna interface, based on the received traffic load information, causing the RF conditioning module to adjust a distribution of transmission power applied to the one or more superposition RF signals that the RF conditioning module routes and transmits to the array of remote antenna nodes.

24. The method of claim 22, further comprising:
at the RF conditioning module, receiving respective reverse superposition RF signals from one or more remote antenna nodes of the array of antenna nodes;
at the RF conditioning module, deconstructing each of the received respective superposition RF signals into a one or more respective reverse passband signals; and
at the RF conditioning module, routing and transmitting each of the one or more respective reverse passband signals to a respective destination, wherein the respective destination is selected from the group consisting of the BTS device, and the BBU device.

25. The method of claim 19, wherein the array of remote antenna nodes comprises a number of antenna nodes,
and wherein splitting each received respective input digital RF physical signal into the respective number of duplicate signals comprises:
splitting each received respective input digital RF physical signal into a number of duplicate signals that equals the number of antenna nodes.

26. The method of claim 25, wherein combining the particular duplicate signals selected from among each of the respective number of duplicate signals into the one or more superposition RF signals comprises:
combining one of the number of duplicate signals from each split respective input digital RF physical signal into each of a number of superposition RF signals, wherein the number of superposition RF signals equals the number of antenna nodes.

27. The method of claim 19, wherein the apparatus further comprises a plurality of electro-optical converters each having a communicative connection to one of a plurality of third physical interfaces of the RF conditioning module,
and wherein the method further comprises:
at each of one or more of the plurality of electro-optical converters, receiving one of the one or more superposition RF signals from the RF conditioning module;
at each of the one or more of the plurality of electro-optical converters, converting the received one of the one or more superposition RF signals into an optical superposition RF signal; and
at each of the one or more of the plurality of electro-optical converters, transmitting the optical superposition RF signal to an antenna node of the array of remote antenna nodes via a respective fourth physical interface of the each of the one or more of the plurality of electro-optical converters.

28. The method of claim 27, wherein routing and transmitting the one or more superposition RF signals to an array of remote antenna nodes comprises:
routing and sending each of the one or more superposition RF signals to the one or more of the plurality of electro-optical converters via one of the plurality of third physical interfaces.

* * * * *